April 9, 1963 R. D. MARX 3,084,704
TANK VENTING VALVE ARRANGEMENT
Filed May 16, 1960
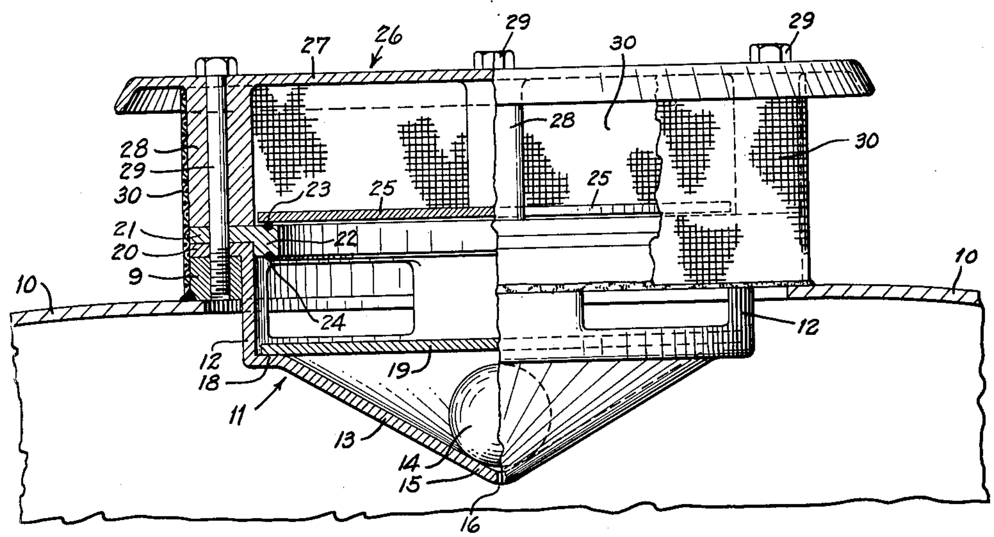
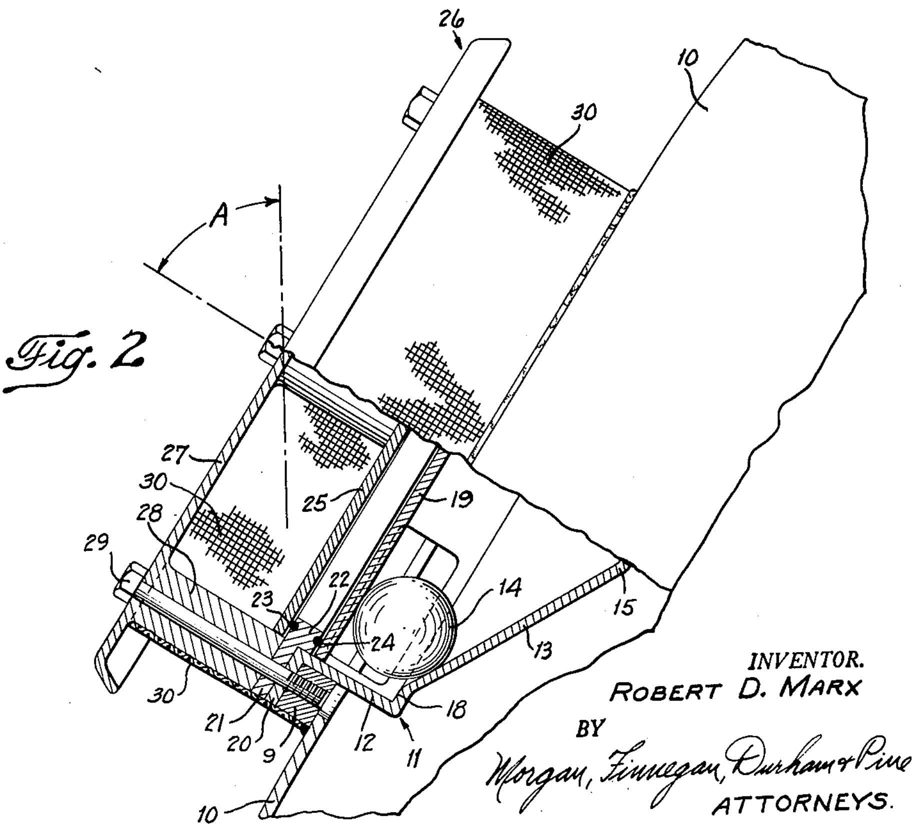
INVENTOR.
ROBERT D. MARX
BY
Morgan, Finnegan, Durham & Pine
ATTORNEYS.

United States Patent Office 3,084,704

Patented Apr. 9, 1963

3,084,704

TANK VENTING VALVE ARRANGEMENT

Robert D. Marx, Valley Stream, N.Y.
(952 Meeker Ave., Brooklyn 22, N.Y.)

Filed May 16, 1960, Ser. No. 29,454
16 Claims. (Cl. 137—43)

This invention relates to vent valves and more particularly to vent valves designed for use in truck tanks and the like.

Known vent valves for use in tanks for the transportation and storage of liquid products, such as petroleum and gasoline, are generally of the spring-loaded poppet type. These valves are employed for venting the tank in the presence of excessive internal pressures. While these valves are generally adequate for the purpose, they have the disadvantages of limited venting capacity and low sensitivity. The latter shortcoming is reflected in the fact that a typical vent valve requires approximately 3½ p.s.i. differential pressure in order for the vent to open. This requirement is engendered by the employment of a spring utilized to bias the valve into a closed position. The spring, in turn, is required to provide a safety feature operative in the event the tank rolls over or assumes a serious list. The spring must be strong enough to keep the vent closed in spite of the weight of the product which in this condition tends to open the valve.

The employment of spring loading with a concomitant requirement for a substantially high actuating pressure, and the limited venting capacity of known valves, makes their use in certain applications hazardous. For example, the recognized critical rupturing pressure in a typical tank is approximately 5 p.s.i. If this tank employs a known valve, operative at about 3½ p.s.i., then a very narrow margin of safety exists. This is particularly significant in tanks which are bottom-loaded. In such systems the pumping rate is substantial per minute and the pump pressure is in the order of 65 p.s.i. The limited performance of conventional vent valves in this application is a potential source of danger and, in fact, bottom-loaded tanks so equipped have been known to rupture.

Another source of danger with known venting arrangements lies in their inability to discharge an adequate amount of the tank's product in the event that the cut-off mechanisms for terminating the loading operation, fail. In such an event the pressures and flow rates associated with bottom loading can cause a rupture of the tank even though the vent valves are discharging the product at their maximum capacity.

It is thus an object of the invention to provide improved venting with a novel vent valve having high capacity and sensitivity.

It is another specific object of the invention to provide improved venting arrangements with a novel vent valve which operates at a differential pressure substantially less than that required by present arrangements.

A further object of the invention is to provide a highly sensitive, large capacity vent valve which includes means for preventing the discharge of the tank's product in the event the tank tips unduly or rolls over.

A further object of the invention is to provide a novel vent valve for truck tanks and the like which operates on inertial principles and has high sensitivity and large capacity.

A still further object of the invention is to provide a vent valve including a safety feature operative during roll-over which does not require the usual spring loading arrangement.

These and other objects and advantages of the invention will be set forth in part hereinafter and in part will be obvious herefrom, or may be learned by practice with the invention, the same being realized and attained by means of the instrumentalities and combinations pointed out in the appended claims.

Briefly and generally, the invention comprises a vent valve adapted to be secured to a tank containing a fluid product, the valve including means for defining a port, main closure means comprising a venting disk positioned over the port and inertially urged into closing relationship therewith, auxiliary closure means in the form of a roll-over disk, and a ball actuator confined in an inclined plane structure adjacent the roll-over disk and adapted to impel this disk into closing relationship with respect to the port when the tank tilts unduly. The main disk acts, by virtue of its weight, to seal the tank except when the internal pressure exceeds a value necessary to overcome the weight of the main disk. The roll-over disk is so arranged within the valve that when the tank tilts unduly and is actuated by the ball-inclined plane arrangement as aforesaid, the weight of the product complements this action and acts to maintain the roll-over disk in the closed position. Guide means for controlling the movement of both disks and providing the necessary venting passageways, cooperate with the above-described structures.

The invention consists in the novel parts, constructions, arrangements, combinations and improvements herein shown and described.

Serving as an illustration of the exemplary embodiment of the invention are the drawings, of which:

FIGURE 1 is an elevation view partly in section of a valve according to the invention installed on a tank body; and FIGURE 2 is a drawing of the valve partially in section and partially in schematic form illustrating the relationship of parts when the tank has been tipped (in any plane) through a predetermined angle.

In FIGURE 1 the valve according to the invention is shown as comprising an annular base 9 which is secured to the tank body 10 over an opening therein by any suitable means such as welding. Cooperating with the base 9 is a lower vent assembly 11 comprising an upper cylindrical cage section 12 and integral therewith a ball chamber 13 of generally conical shape. Disposed in chamber 13 is a ball 14, preferably of Monel or bronze, which is carried in the pocket formed by the apex section 15 of the chamber 13. A vertically oriented drain hole is provided at the apex for draining off any tank product which accumulates therein. The lower vent assembly 11 comprising the aforementioned cage and ball chamber is seated in the annular base 9 with a part of the cage and the entire chamber being hung below base 9 and within tank 10. At the junction of the chamber and cage there is provided a horizontal seat 18 which is formed as a result of the reduced diameter of the junction. Horizontally disposed on the seat 18 is a roll-over disk 19 which is free to move vertically within the confines of the guiding cage structure under circumstances more fully described hereinafter. The disk is oriented relative to the cage structure 12 such that the upper surface is exposed to fluid passing through the apertures in the cage structure and into the venting area of the valve. The sides and lower surface of the disk are substantially isolated from the product and other fluids by the lower section of the cage and by the ball chamber which is imperforate on its sides except for drain hole 16. It may be seen in FIGURE 1 that the open areas of the cage structure 12 are large, thus providing for a large venting capacity. The enclosure of all but one surface of the roll-over disk prevents movement of the same in a direction to limit the venting action when turbulent currents are passing through the apertures or open areas of the cage structure.

Seated above the flange 20 of the lower vent assembly 11 is an annular ring 21, the inner periphery of which serves to define a portion of the port through which the venting action occurs. The outer diameter of the ring 21 conforms substantially with the outer diameter of flange 20 and base plate 9 so that the exterior of the entire assembly presents a smooth cylindrical surface. The inner diameter of ring 21 is smaller than the inner diameter of cage 12 and includes a vertical flange section 22 which nests within the upper cylindrical sides of cage 12. Included in this flange or seat section 22 are two O rings 23 and 24 installed on the upper and lower horizontal surfaces adjacent the inner periphery of the ring. Located over the port defined by the inner periphery of ring 21 is the main closure disk 25, which in the lower position covers the port and is positioned on the seat section 22 of ring 21. The disk is urged into the closed position by its own weight; in the presence of internal pressure, which in the preferred embodiment is less than ½ oz. per sq. in., the disk is pushed upward to free the port and provide venting action. In view of the large size of the disk and the port—in a preferred embodiment the disk is over 5 inches in diameter— large venting capacity is provided, the vented fluid passing through the open areas of cage 12, through the port and out through the open areas through a hat assembly 26.

This hat assembly comprises horizontal cover 27 disposed in spaced and parallel relationship above the disk 25 by means of posts 28 periodically spaced around the periphery of the disk and aligned with the base 9, flange 20 and annular ring 21. These posts also serve to guide the vertical motions of venting disk 25. The cover 27 overhangs the lower portions of the valve and provides protection against moisture, foreign matter and the like.

Installed vertically in each post 28 is a machine screw 29 which passes through holes in the respective post, thence through ring 21 and flange 20 and is tapped into a threaded bore in base 9. These screws accordingly act to secure the hat 26, annular ring 21, lower vent assembly 11 and base 9.

Serving to minimize explosions during a fire and also functioning as a protective device is a screen 30 which circumscribes the sides of the overall valve assembly.

The operation of the valve in the event of roll over is illustrated in FIGURE 2 where the valve is shown tilted through angle A. In such an event ball 14 rolls out of its pocket 15, contacts roll-over disk 19 and urges the same into closing relationship with respect to the port defined by ring 21. The contents of the tank also act against disk 19, tending to hold it in the closed position.

The invention in its broader aspects is not limited to the specific mechanisms shown and described but departures may be made therefrom within the scope of the accompanying claims without departing from the principles of the invention and without sacrificing its chief advantages.

What is claimed is:

1. A vent valve for truck tanks and the like, said valve having high sensitivity and capacity and comprising port defining means for the passage of vented fluids, an inertially biased plate, guide means positioned relative to said plate to limit the motion thereof, said guide means and said plate being oriented relative to the port formed by said defining means such that said plate closes off said port when the weight of said plate exceeds the differential pressure opposing said weight, auxiliary guide means, auxiliary closure means having limited motion defined by said auxiliary guide means, gravity direction sensing means substantially isolated from said passage of said vented fluids and disposed relative to said auxiliary closure means to cause said auxiliary closing means to move under the guidance of said guide means to a position which is effective to close off said port when the direction of gravity relative to said valve changes by an excessive amount.

2. A vent valve according to claim 1, in which said plate is arranged with respect to said guide means such that said plate is rectilinearly displaced away from said port when said weight of said plate is less than the differential pressure acting on said plate.

3. A vent valve according to claim 1, in which said auxiliary closure means is inertially retained away from said port except when activated by said gravity responsive means.

4. A valve according to claim 1, in which said auxiliary guide means includes passageways communicating with said port and the interior of said tank, said passageways being partially bounded by said auxiliary closure means.

5. A valve according to claim 1, in which said plate is located above said port and said auxiliary closure means includes a plate located below said port.

6. A valve according to claim 1, in which said auxiliary closure means includes a plate responsive to the weight of the contents of said tank when said tank is angularly displaced a predetermined amount.

7. In a vent valve for a fluid-containing tank, said valve having a port for the passage of vented fluids and a valve for controlling said port, means for closing said port in the event said tank is tilted through an excessive angle comprising an auxiliary valve, guide means for guiding said valve into closing relationship with respect to said port and means substantially isolated from said passage of said vented fluids and responsive to the gravity vector for urging said auxiliary valve into said closing relationship when said tilting occurs.

8. A vent valve according to claim 7, in which said auxiliary valve is maintained in open relationship with respect to said port by virtue of its own weight except when said tank is tilted an excessive amount.

9. A vent valve according to claim 7, in which said auxiliary valve is maintained in closing relationship due to the weight of the contents of said tank when said tank is tilted through a predetermined angle.

10. In a vent valve for a fluid-containing tank, said valve having a port for the passage of vented fluids and a valve for controlling said port, means for closing said port in the event said tank is tilted through a predetermined angle, comprising a guide structure below said port, said guide structure including apertures communicating with said port and the interior of said tank, a plate disposed at the base of said guide structure in unobstructed position with respect to said apertures, a chamber located beneath said plate, said chamber being adapted to isolate the lower side of said plate from said passage of said vented fluids, a movable member and an inclined surface structure within said chamber, said movable member being adapted to travel on said inclined surface structure to thereby engage said plate and displace the same into closing relationship with respect to said port when said tank is tilted through an excessive angle.

11. A vent valve according to claim 10, in which said inclined surface comprises the generally conical sides of said chamber.

12. A vent valve according to claim 10, in which said movable member comprises a ball disconnected from said chamber and inclined surface structure.

13. A vent valve according to claim 10, in which said plate is disconnected from said guide means.

14. A venting valve for truck tanks and the like, said valve having high sensitivity and capacity and including a feature for disabling the venting operation in the event of spillage, comprising a port structure for providing communication between said tank and the exterior thereof, a disk mounted above said structure and adapted to be seated thereon in closing relationship therewith, guide means for said disk comprising a plurality of vertical posts positioned around the periphery of said disk and adapted to substantially confine said disk to vertical motions, said disk being otherwise uninhibited in motion except for the effects of its weight and adapted to be raised when pressure on the lower surface thereof exceeds an amount corresponding with said weight to thereby provide venting action, a protective cover mounted above said port and disk, said cover being secured to said vertical posts and being in spaced parallel relationship with said disk, a guide structure suspended below said port and including a seat, a roll-over disk positioned on said seat, said roll-over disk having a size and shape generally conforming to the size and shape of said first-mentioned disk, a generally conical enclosure suspended below said seat and including a ball normally carried in the apex region of said conical member, the sloping surface of said conical member being adapted to guide said ball into contact with said roll-over disk in a manner such that the latter moves relative to said guide structure into proximity with said port to close the same in the event said tank tilts through an excessive angle.

15. A venting valve according to claim 14, in which said guide structure comprises a cage having a plurality of vertical posts around the periphery thereof.

16. A venting valve according to claim 14, in which the base of said conical enclosure coincides with said seat.

References Cited in the file of this patent

UNITED STATES PATENTS

| | | |
|---|---|---|
| 593,109 | Lear | Nov. 2, 1897 |
| 1,363,606 | Loudon | Dec. 28, 1920 |
| 1,483,436 | Hazard | Feb. 12, 1924 |
| 1,724,878 | Jensen | Aug. 13, 1929 |
| 2,262,746 | Allen | Nov. 18, 1941 |

FOREIGN PATENTS

| | | |
|---|---|---|
| 908,989 | France | Nov. 12, 1945 |
| 1,183,021 | France | Jan. 26, 1959 |